United States Patent
Johnson

[15] 3,677,455
[45] July 18, 1972

[54] FILM ADVANCING DEVICE
[72] Inventor: Robert B. Johnson, Rochester, N.Y.
[73] Assignee: Eastman Kodak Company, Rochester, N.Y.
[22] Filed: Oct. 1, 1970
[21] Appl. No.: 77,206

[52] U.S. Cl. ............................. 226/49, 226/117, 226/119, 226/196
[51] Int. Cl. ........................................................ G03b 1/40
[58] Field of Search .................. 226/25, 37, 39, 49, 115, 117, 226/196, 119, 113, 36; 352/159

[56] References Cited
UNITED STATES PATENTS

| | | | |
|---|---|---|---|
| 1,997,409 | 4/1935 | May .................................. | 226/196 X |
| 3,165,250 | 1/1965 | Ewald et al. ...................... | 226/196 X |
| 3,561,655 | 2/1971 | Yasukawa .......................... | 226/113 X |

FOREIGN PATENTS OR APPLICATIONS

| | | | |
|---|---|---|---|
| 36,072 | 4/1930 | France ................................. | 226/196 |

*Primary Examiner*—Allen N. Knowles
*Attorney*—Robert W. Hampton and Milton S. Sales

[57] ABSTRACT

A motion picture projector having selectively operable means for intermittently moving film through a projection gate in either forward or reverse directions and for continuously moving film through the gate for rewind operation includes a device for advancing film between a supply roll and the gate in forward projection, reverse projection and rewind modes of operation of the projector. Film is advanced by the device through a channel defined by at least one rotatable roller and wall means spaced apart sufficiently to permit an excess of film to build up ahead of the gate. The channel defining means may be coated with a high friction material so that during forward projection when film is pushed into the channel from the supply roll by a tendency drive mechanism, contact between the film and the high friction material coating prevents movement of more film into the channel by the tendency drive than is withdrawn from the other end of the channel by the intermittent film moving means. During reverse projection operation of the projector, contact of the film with the high friction material attenuates the force applied to the film by the tendency drive and prevents that force from reaching the film in the gate. The force attenuating effect is reduced during threading and rewind operation by permitting the roller to be rotated by the film passing thereover.

11 Claims, 2 Drawing Figures

ROBERT B. JOHNSON
INVENTOR.

BY Milton S. Sales
Robert W. Hampton

ATTORNEYS

FILM ADVANCING DEVICE

BACKGROUND OF THE INVENTION

1. Field of the Invention

The present invention relates to motion picture projectors, and more particularly to a device for advancing film in either direction between the projection gate and a roll of film in such projectors.

2. Description of the Prior Art

The conventional motion picture projector intermittently feeds film a frame at a time past the projection aperture of a gate and depends upon the presence of a loop of film in advance of the gate to isolate the intermittent film feed and gate from the supply reel to insure steadiness of the film in the gate when the intermittent mechanism is not moving film. One method of maintaining such film loops used in the prior art has been by providing constantly rotating feed sprockets which advance the film from the supply reel to the gate at an appropriate rate to maintain these loops. At the same time, these sprockets isolate the film in the gate from any transient forces on the film originating at the supply reel for one reason or another and which transient forces might tend to cause unsteadiness of the film in the gate.

Sprocketless projectors, i.e., ones which do not have one or more constantly driven sprockets for feeding the film to loops on both sides of the gate, have been marketed but they do not completely isolate the film gate from the supply reel. Instead of sprockets, these projectors rely upon the use of spring-loaded snubbers, or the like, located between the gate and each reel to maintain the equivalent of a loop of film at each side of the gate and to partially isolate the intermittent film advancing mechanism and gate from any excessive loads which might be imposed on the film in the gate because of either the inertia of the supply and take-up reels and/or the reel drive mechanisms.

When larger reels, such as those containing 400 feet of film, are used on such sprocketless projectors, the transient loads on the reach of film between the reel from which the film is being delivered and the spring-loaded snubber located between that reel and the gate increases, sometimes to the point that the snubber cannot accommodate the increased load. These transient loads which the snubber cannot accommodate result from a number of different causes including reel "pick", which occurs when the film may frictionally engage the reel flanges momentarily because of a bent flange, reel wobble, unintentional momentary stoppage or speedup of the delivery reel by the operator touching the same while it is running, etc.

In addition to these enumerated causes of transient loads from the film, the problem is aggravated when the projector is one of the variable rate type, such as disclosed in U.S. Pat. No. 3,261,654 in the names of Faber and McClellan. In this type of projector, the rate of projection can be shifted rapidly without stopping the film feeding mechanism, imposing on the film a heavy and abrupt transient load which the conventional snubber cannot handle. The result is that the snubber is momentarily over-exerted in its movement and an excessive load is placed on the intermittent film feeding mechanism which causes it to fail to properly register the successive frames of film at the projection aperture of the gate. In smoothing out the surges resulting from transient loads, the snubber will over-correct in the opposite direction and a hunting action occurs before the snubber finally settles down to its normal frequency of operation. During this interval in which the snubber is not operating at its normal frequency (possibly for many successive frames of film) the picture moves up and down on the screen.

Depending upon the repeatability of occurrence of these transient loads, this unsteadiness in film projection can occur throughout a major portion of an entire film presentation. It will be obvious that the effect of these transient loads on the film snubbers will increase as the size of the film reels increase because the effect increases directly with the inertia of the reels. While significant improvements have been made in snubber designs, such as for instance that disclosed in U.S. Pat. No. 3,350,025, the effect of reel inertia has not been completely isolated from the gate.

U.S. Pat. No. 3,514,195 to Nemeth shows a motion picture projector and endless film cartridge combination in which film is frictionally fed from the inner convolution of a loosely wound film roll, through the projector to an intermittent film drive mechanism, and back to the outer convolution of the roll. The friction feed consists of a hub member which rubs against the film and is faster than the intermittent drive mechanism. The film is pushed into a guide consisting of fixed walls spaced apart so that when more film is pushed into the guide then is withdrawn by the intermittent, the film buckles and presses against the sides of the guide. This pressure produces friction which overcomes the drive effect of the hub and the buckles form a compensating loop so that there is always enough film for the intermittent. While the film handling system of Nemeth is suitable for use with endless film cartridges in that it overcomes the effect of inertia on the intermittent characteristic of the above-described systems employing spring-loaded snubbers, there is no provision for either threading, reverse projection or rewind. Further, relative movement between the hub and the film may result in damaged or scratched film surfaces.

SUMMARY OF THE INVENTION

It is an object of the present invention to provide a motion picture apparatus which will satisfactorily accommodate large rolls of film without being subject to undesirable unsteadiness of picture due to transient loads which may be applied to the film from the rolls during projection.

Another object of the present invention is to provide improved web handling apparatus that facilitates exceptionally fast threading of the web from a web supply roll to a web gate, and to provide such apparatus that aids reverse movement of the web from the gate to the roll.

Still another object of the present invention is to provide a projector which has a tendency drive for accumulating a free length of film in a guide path ahead of the intermittent film drive mechanism without relative motion between the tendency drive and the film.

Yet another object of the present invention is to provide a projector which is capable of forward project, reverse project and rewind operations with a tendency drive mechanism for accumulating a compensating loop ahead of the gate during forward project operation, with a tendency drive mechanism for receiving film from the gate during reverse projection and rewind, with means for isolating the force of the tendency drive from the gate during forward or reverse projection operation, and with means for disabling the isolating means during rewind operation of the projector.

In accordance with the above objects, a preferred embodiment of the present invention includes a motion picture projector having a film gate with an intermittent film advance mechanism associated therewith and means for receiving a film supply roll. A tendency drive mechanism including a clutch driven roller with a high friction surface is positioned along a film threading path to withdraw film from a received roll and to advance the film toward the film gate. Between the tendency drive member and the gate, a force attenuation path includes a first section formed by a pair of spaced walls defining a channel sufficiently wide to permit the film to buckle when more film is pushed into the channel by the tendency drive mechanism than is withdrawn by the intermittent film advance mechanism and a second section formed by the surface of a selectively rotatable roller and a sinuous wall curved thereabout and spaced therefrom a distance insufficient to permit film buckling.

In another embodiment of the present invention, the tendency drive mechanism advances film into a force attenuation path defined by the surfaces of two selectively rotatable rollers and connecting walls. The walls are spaced from each other and from the roller surfaces an amount insufficient to permit film buckling, but sufficient to permit the formation of a compensating loop.

The invention, and its objects and advantages, will become more apparent in the detailed description of the preferred embodiments presented below.

BRIEF DESCRIPTION OF THE DRAWING

In the detailed description of the preferred embodiments of the invention presented below, reference is made to the accompanying drawings in which.

DESCRIPTION OF THE PREFERRED EMBODIMENTS

Because motion picture projector apparatus and the like are well known, the present description will be directed in particular to elements forming part of, or cooperating more directly with, apparatus in accordance with the present invention. It is to be understood that projector elements not specifically shown or described may take various forms well known to those skilled in the art.

Figure 1:
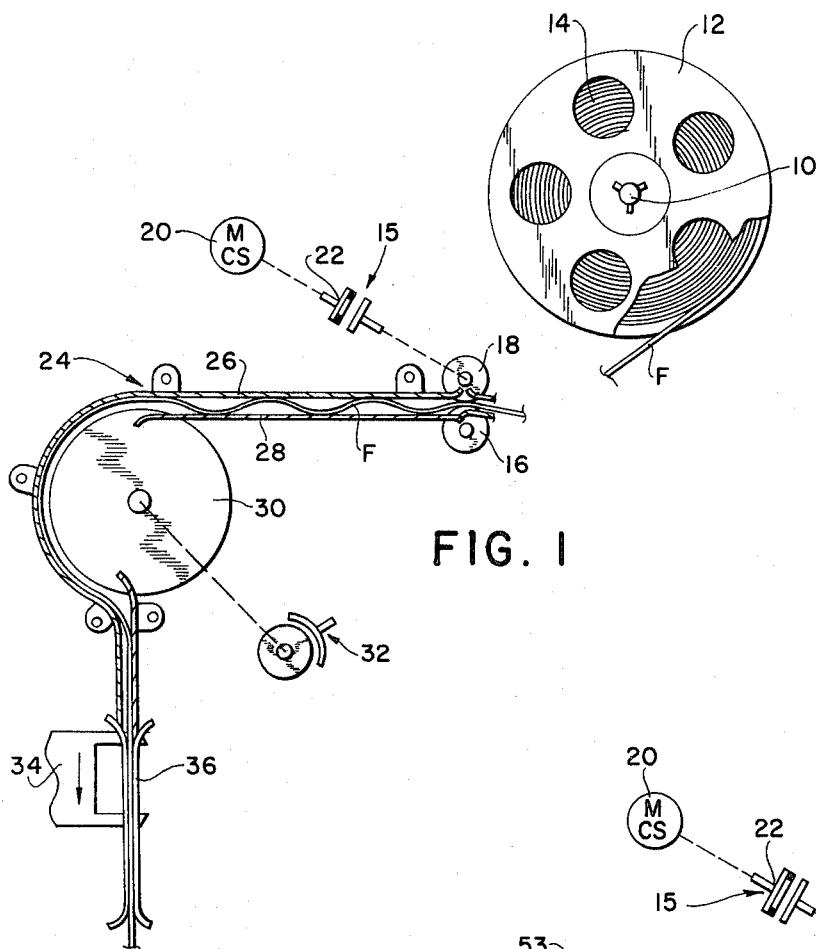
FIG. 1 is a schematic view of a portion of a motion picture projector including the film advancing device of the present invention.

Referring to FIG. 1, the film handling apparatus of a sprocketless motion picture projector constructed in accordance with a preferred embodiment of the present invention is shown as comprising a supply spindle 10 on which a supply reel 12 containing a roll 14 of film may be mounted so as to be keyed to the spindle to rotate therewith. The film F leaving supply roll 14 is threaded into a tendency drive mechanism 15 which comprises a pressure roller 16, a driven roller 18, a constant speed motor 20 and a slip clutch 22 for frictionally interconnecting motor 20 and roller 18. Driven roller 18 has a high friction surface in contact with the film to insure that the roller will start and stop with the film to avoid surface abrasion on the film. Pressure roller 16, which is spring-biased toward roller 18, is driven by the film.

Tendency drive mechanism 15 pushes film F into a sinuous channel or film guide 24 formed in two sections. The first section includes a pair of walls 26 and 28 spaced sufficiently from each other to permit film F to buckle in the channel as shown in FIG. 1. The cross-sectional width of the channel as viewed in FIG. 1 should not exceed 0.080 inches for normal film thickness of 0.0057 inches in order to prevent the film from doubling over on itself in the channel.

As the film emerges from the channel section formed by walls 26 and 28, it passes into a second section formed by a roller 30 which is rotatably mounted in the projector and wall 26. Roller 30 is normally free to rotate, but can be clamped by for instance a brake 32 to prevent rotation. Channel or film guide 24 formed by the surface of roller 30, wall 26 and wall 28 is sufficiently wide and long to permit the accumulation of an excess of film having a length in excess of the length of one film frame. A length of free film of this size permits film advance of one film frame through the gate by pulling film from the channel without driving additional film into the channel by roller 18. Intermittent advance of film is achieved by a pull down claw 34 which is part of an intermittent film advance mechanism. Emerging from channel 24, film F passes into a conventional projection film gate 36 having an aperture plate and a pressure pad which prevents movement of the film through the gate when pushed with a force below a first value.

During film threading operation, the leading end of film F is withdrawn from supply roll 14 by any convenient means, either manually or automatically, the latter being shown for example in coassigned U.S. Pat. No. 3,429,518 in the name of McKee. The leading end of the film is fed between rollers 16 and 18, roller 18 being driven by constant speed motor 20 through slip clutch 22. The film is pushed by drive 15 along the first section of channel 24 as defined by walls 26 and 28 until it reaches roller 30. At this time, roller clamping brake 32 may be released so that roller 30 is free to rotate if film F contacts its periphery. Emerging from sinuous channel 24, the leading end of film F reaches gate 36. At that point, pull down claw 34 engages the film to proceed to intermittently advance the film through the gate one frame at a time.

Tendency drive 15 which comprises constant speed motor 20, slip clutch 22 and rollers 16 and 18 threads the film through the threading path at a very fast rate so that projection can begin soon after the operator begins to thread the machine. For example, motor 20 may operate at 2,000 rpm with roller 18 being one-half inch in diameter. Not only does this provide fast threading, but it also provides ample film speed for projector operation at 54 fps, as well as at 18 and 6 fps as will be explained hereinafter. It is important that the film is fed into channel 24 at a rate that exceeds the rate required for the maximum projection rate in order for the film to assume a buckled shape.

As soon as threading is complete and the film end reaches gate 36, operation of the pull down claw shows the film at the gate and tendency drive 15 forces film F into the configuration shown in FIG. 1, hugging the outside of the channel section around roller 30 and buckling in the channel formed by walls 26 and 28. Film does not buckle around roller 30 because that portion of channel 24 is too narrow.

Clutch 22 is set to slip at a torque which will in cooperation with rollers 16 and 18 exert a substantial force on the film to drive it into channel 24. The force applied to the film by tendency drive 15 will be greater than can be held by the gate pressure pad, but at each contact point of film with the sides of the channel, force applied to the film by roller 18 is attenuated until it is below the force holdable by the gate. This attenuation phenomenon is greatly increased if the channel walls are coated with a high friction material such as, for example, Corprene. The effect of the force attenuation means is to largely isolate the forces applied to the film at the beginning of the path from the gate. Were it not for this force reduction, the film would tend to slip through the gate when pull down claw 34 is withdrawn from the film. Because of the reduced forces on the film, the pressure applied thereto at gate 36 is sufficient to hold the film steady during projection.

During forward projection, film F assumes the configuration shown in FIG. 1, frictionally engaging walls 26 and 28 to resist the force of tendency drive 15 and causing clutch 22 to slip. As mentioned hereinbefore, channel 24 has the capacity to hold excess film having a length at least equal to the length of one frame of film, so that when a frame is demanded by claw 34, the channel supplies it with negligible force load on the claw. As film is withdrawn from channel 24 by the pull down mechanism, tendency drive 15 acts immediately to refill the channel with the maximum amount of film that can be driven into the channel by the tendency drive 15. The refilling action is so fast that projection rates of 54 frame per second (and greater) operation can be easily obtained.

For reverse projection operation of the apparatus, roller 30 is clamped by brake 32 to prevent it from rotating. The direction of the tendency drive is reversed such as by reversing motor 20 or by appropriate gearing (not shown) to pull film F from channel 24. The film hugs the surface of roller 30 so that the force applied to the film by the tendency drive is attenuated in the channel and very little of that force reaches the film in gate 36. As claw 34 intermittently advances film F upwardly through gate 36, the length of film in channel 24 is momentarily increased to push it away from the surface of roller 30, thereby permitting tendency drive 15 to pull an equal amount of film out of the channel, restoring contact between the film and the roller surface. Film emerging from channel 24 is wound upon reel 12 which is rotated in a counterclockwise direction by a conventional tendency drive (not shown). Of course, the tendency drive for reel 12 may be sufficient to withdraw the film from the channel without the assistance of tendency drive 15.

It is desirable for smooth operation to eliminate as much force attenuation as possible during film rewind operation. Therefore, brake 32 is released to unclamp roller 30. Claw 34 is withdrawn from the film and roller 18, which is driven in a reverse direction by motor 20, pulls film rapidly through gate 36, around roller 30 which is now free to rotate with the film, and out of the channel section defined by walls 26 and 28. At this time, reel 12 is driven in a film take-up direction at a speed that is sufficient to wind film onto the reel as fast as it is delivered by drive 15.

Figure 2:
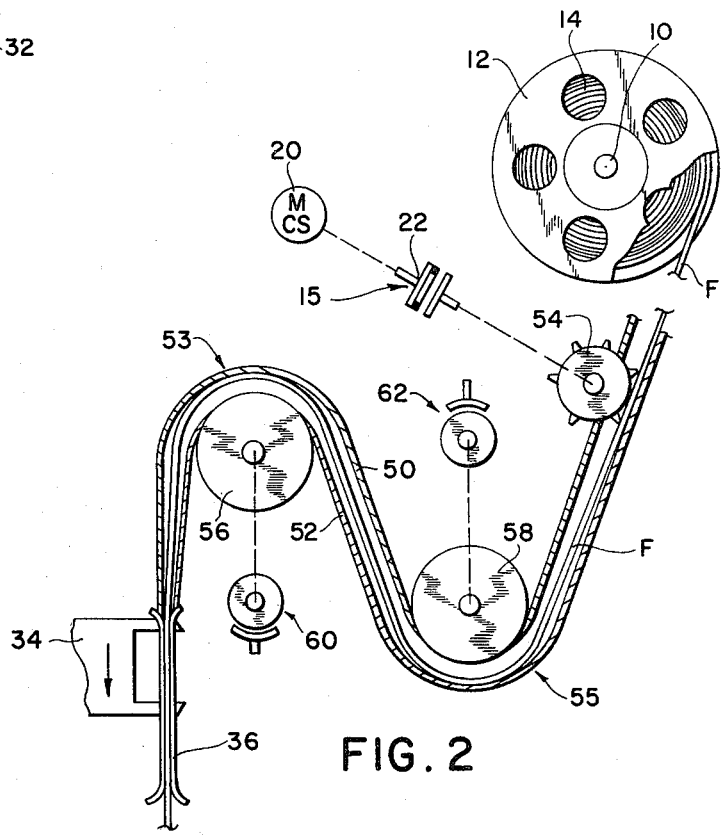
FIG. 2 is a schematic view of a portion of a motion picture projector including another embodiment of the film advancing device of the present invention.

The film guide channel can be any shape or length as long as it can hold an excess of film having a length at least as great as a length of one film frame. Another embodiment of the invention including a sinuous channel defined by a pair of spaced walls 50 and 52 is shown in FIG. 2. The walls form two curves 53 and 55 and are spaced sufficiently from each other to permit the formation of a compensating loop between a sprocket wheel 54, which has been shown as an alternative to rollers 16 and 18 of FIG. 1, and film gate 36. However, walls 50 and 52 are sufficiently close to each other to prevent buckling of the film therebetween. As in the embodiment shown in FIG. 1, the inner surfaces of the walls may be coated with a high friction material. The surfaces of a pair of rollers 56 and 58 project through openings in walls 52 and 50, respectively, and define the inner radii of the bends in the film guide channel. Rollers 56 and 58 have clamping mechanisms 60 and 62, respectively, associated therewith.

During film threading, clamps 60 and 62 are released and the film is rapidly advanced by drive sprocket 54 along the sinuous channel defined by walls 50 and 52 until it reaches film gate 36 where it is picked up by claw 34 and advanced at a slower rate. When the leading end of film F reaches the gate, additional film forced into the film guide channel by drive 15 moves the film into engagement with the inner surface of wall 50 in the area of curve 53 and into engagement with the inner surface of wall 52 in the area of curve 55 where it contacts the high friction coating to attenuate the force applied through slip clutch 22 by constant speed motor 20.

As claw 34 intermittently advances film through gate 36 during forward projection operation of the apparatus, the film is pulled away from the wall surfaces of the guide channel to permit tendency drive 15 to advance an equal amount of film into the channel. Thus, it can be seen that the operations of the embodiment shown in FIG. 2 in the film threading and forward projection modes are substantially the same as those of the embodiment shown in FIG. 1. During reverse projection, clamps 60 and 62 are applied to prevent rotation of rollers 56 and 58. Tendency drive 15 pulls the film against the rollers, which are coated with a high friction material, to attenuate the force applied by sprocket 54 and to isolate the film in gate 36 from that force. As claw 54 pushes film into the channel, the film is raised from the roller surfaces, permitting the tendency drive to once again pull the excess film from the channel and to return the film to the roller surfaces.

As in the embodiment shown in FIG. 1, rollers 56 and 58 are permitted to rotate during high speed rewind to eliminate the attenuation effect of the channel. Claw 34 is withdrawn from the film, and the film is pulled through the gate by the tendency drive.

While I have shown the film advancing device as being located between the film gate and the supply roll, it will be understood by those skilled in the art that a film snubber should be located between the gate and the take-up roll (not shown) for reversible projectors. It is pointed out that the device of the present invention is also highly suitable for use at that location as well as in the location shown in the drawings.

The invention has been described in detail with particular reference to preferred embodiments thereof, but it will be understood that variations and modifications can be effected within the spirit and scope of the invention.

I claim:

1. A device for advancing film from a supply roll to a film gate, said film advancing device comprising:
    means for advancing film through the film gate;
    a member positioned to engage the film between the supply roll and the gate without slippage, said member being movable to push film toward the gate;
    power means for moving said member;
    means interconnecting said power means and said member for limiting the force applied to the film by said member;
    means for guiding the film from said member to the gate with a confined free length of film between said member and the film advance means; and
    force attenuation means frictionally engaging the film in said guide means for resisting more movement of film into said guide means than is withdrawn by the intermittent film advance means, whereby force applied to the film by said member is partially attenuated in said guide means.

2. A device as defined in claim 1 wherein:
    said guide means comprises two opposed walls forming a channel, said walls being spaced sufficiently from each other to permit accumulation in the channel of a length of film that is longer than the channel; and
    said force attenuation means comprises a high friction material on said walls for contacting and frictionally restraining the film when the accumulated film length exceeds a predetermined size.

3. A device as defined in claim 1 wherein:
    said guide means comprises two opposed walls forming a chennal said walls being spaced sufficiently form each other to permit the film to buckle into a wavy configuration to form a plurality of buckles; and
    said force attenuation means comprising a high friction material on said walls for contacting and frictionally restraining the film when said plurality of buckles exceed a predetermined size.

4. A device as defined in claim 1 wherein:
    said guide means comprises two opposed walls forming a sinuous channel, said walls being spaced sufficiently from each other to permit accumulation in the channel of a length of film that is longer than the channel but sufficiently close to each other to prevent buckling of the film into a wavy configuration within said channel; and
    said force attenuation means comprises a high friction material on said walls for contacting and frictionally restraining the film when the accumulated film length exceeds a predetermined size.

5. A device as defined in claim 1 wherein said member is a sprocket wheel.

6. A device for advancing film from a supply roll to a film gate having pressure means for preventing film from moving through the gate when pushed with a force below a first value, said film advancing device comprising:
    means for advancing film through the film gate at a first rate;
    a member positioned to engage the film between the supply roll and the gate without slippage, said member being movable to push film toward the gate;
    power means for moving said member at a rate to push film toward the gate at least as fast as said first rate;
    means frictionally interconnecting said power means and said member for limiting the force applied to the film by said member to a second value greater than the first value; and
    means between said member and the gate for attenuating the force applied to the film by said member to a value less than the first value.

7. A device as defined in claim 6 wherein said force attenuating means comprises:
    means for guiding the film from said member to the gate with a confined free length of film between said member and the intermittent film advance means; and
    means for frictionally engaging the film in said guide means for resisting pushing of the film when said member urges film into said guide means.

8. In a motion picture apparatus, a device for advancing film through a threading path from a film gate to a film roll, said film advancing device comprising:

means for guiding the film from the gate to the roll;

means selectively operable for intermittently or continuously moving film from the gate into said guide means, said film moving means including tendency drive means for applying a force to the film to pull from said guide means a length of film corresponding to that fed intermittently into said guide means;

force attenuation means positioned to frictionally engage the film in said guide means for resisting movement of film by said tendency drive means during intermittent operation of said moving means; and means for disabling said force attenuation means during continuous operation of said moving means.

9. A device as defined in claim 8 wherein:

said guide means includes spaced walls defining a curved channel; and said force attenuation means comprises a high friction material on at least one of said walls for contacting and frictionally restraining the film when said tendency drive means pulls the film against said one wall during intermittent operation of said moving means.

10. A device as defined in claim 9 wherein said disabling means comprises means permitting said one wall to move with the film.

11. In a motion picture projector having a film gate and means for receiving a film roll, a device for advancing film between the gate and the roll in forward project, reverse project and rewind modes of operation of the projector, said film advancing device comprising:

means selectively operable for intermittently advancing film through the gate in first and second directions for forward and reverse projection operation of the projector, respectively, or for continuously advancing film through the gate for rewind operation of the projector;

means between the gate and the roll defining a curved channel through which film is guided, said channel defining means including at least one rotatable roller having a high friction surface about which the film is at least partially wrapped;

tendency drive means between said channel and the roll for pushing film into said channel during forward project operation of the projector and for applying a force to the film to pull from said channel a length of film corresponding to that advanced through the gate during reverse project and rewind operation of the projector;

force attenuation means frictionally engaging the film in said channel for resisting more movement of film into said channel by said tendency drive means than is withdrawn by said selectively operable means during forward project operation of the projector; and means preventing rotation of said roller during reverse projection operation of the projector and for permitting such rotation during rewind operation of said projector.

* * * * *